(12) United States Patent
Zach et al.

(10) Patent No.: US 9,157,573 B1
(45) Date of Patent: Oct. 13, 2015

(54) MAGNETIC HOLDING DEVICE

(71) Applicants: Marco J. Zach, Mequon, WI (US); Jon A. DeBoer, Port Washington, WI (US)

(72) Inventors: Marco J. Zach, Mequon, WI (US); Jon A. DeBoer, Port Washington, WI (US)

( * ) Notice: Subject to any disclaimer, the term of this patent is extended or adjusted under 35 U.S.C. 154(b) by 0 days.

(21) Appl. No.: 14/593,109

(22) Filed: Jan. 9, 2015

(51) Int. Cl.
| | |
|---|---|
| *A47G 23/02* | (2006.01) |
| *F16M 13/02* | (2006.01) |
| *F16B 2/22* | (2006.01) |
| *A47J 41/00* | (2006.01) |
| *B60N 3/10* | (2006.01) |

(52) U.S. Cl.
CPC .............. *F16M 13/02* (2013.01); *A47G 23/02* (2013.01); *A47J 41/00* (2013.01); *B60N 3/102* (2013.01); *F16B 2/22* (2013.01)

(58) Field of Classification Search
CPC ..... A47G 1/17; A47G 23/03; A47G 23/0225; A47G 2023/0666; F16B 2001/0035; A47K 5/05; B60R 2011/007; G09F 7/04; B60N 3/102; B60N 3/106; B60N 3/103; B60N 3/108
USPC ................ 248/206.5, 311.2, 314, 312, 312.1, 248/309.4
See application file for complete search history.

(56) References Cited

U.S. PATENT DOCUMENTS

| | | | | |
|---|---|---|---|---|
| 2,217,514 | A * | 10/1940 | Henry | 220/628 |
| 2,770,958 | A * | 11/1956 | Carew | 248/145.3 |
| 3,524,614 | A * | 8/1970 | Sorth | 248/131 |
| 3,610,459 | A * | 10/1971 | Hanson | 220/23.83 |
| 3,642,122 | A * | 2/1972 | Von Ende | 224/562 |
| 4,040,549 | A * | 8/1977 | Sadler | 224/483 |
| 4,405,108 | A * | 9/1983 | Muirhead | 248/309.4 |
| 4,445,495 | A * | 5/1984 | Frost | 126/24 |
| 4,510,665 | A * | 4/1985 | Scheurer | 29/460 |
| 5,186,350 | A * | 2/1993 | McBride | 220/739 |
| 5,641,140 | A * | 6/1997 | Sorenson | 248/205.3 |
| 5,873,486 | A * | 2/1999 | Morgan | 220/739 |
| 5,895,018 | A * | 4/1999 | Rielo | 248/206.5 |
| 6,065,632 | A * | 5/2000 | Moore, Jr. | 220/483 |
| 6,305,656 | B1 * | 10/2001 | Wemyss | 248/309.4 |
| 6,390,319 | B1 * | 5/2002 | Yu | 220/230 |
| 6,676,097 | B2 * | 1/2004 | Chu | 248/346.01 |
| 6,888,940 | B1 * | 5/2005 | Deppen | 379/446 |
| 6,895,642 | B2 * | 5/2005 | Huang | 24/303 |
| 7,021,594 | B2 * | 4/2006 | Exler | 248/311.2 |
| 7,308,969 | B2 * | 12/2007 | McCaslin | 182/129 |
| 7,699,277 | B2 * | 4/2010 | Bagnall | 248/206.5 |
| 7,731,144 | B2 * | 6/2010 | Kazyaka | 248/311.2 |
| 8,001,671 | B2 * | 8/2011 | Mitchell | 29/525.01 |
| 2004/0021049 | A1 * | 2/2004 | Payne et al. | 248/310 |
| 2004/0084593 | A1 * | 5/2004 | Barfield | 248/311.2 |
| 2005/0230586 | A1 * | 10/2005 | Gary | 248/311.2 |
| 2005/0269474 | A1 * | 12/2005 | Kazyaka | 248/311.2 |
| 2007/0114351 | A1 * | 5/2007 | Mitchell | 248/311.2 |

(Continued)

*Primary Examiner* — Nkeisha Smith
(74) *Attorney, Agent, or Firm* — Donald J. Ersler

(57) ABSTRACT

A magnetic holding device includes a magnetic base and an object holder. The magnetic base preferably includes a base magnet and an adhesive pad. The adhesive pad includes a mounting pad, a pressure sensitive adhesive and an adhesive label. The pressure sensitive adhesive is applied to one side of the mounting pad and the adhesive label is applied to the pressure sensitive adhesive. The other side of the mounting pad is secured to base magnet. The object holder includes an object cup, a cup magnet and a retention disc. An inner perimeter of the object cup is slightly smaller than a perimeter of the object to be retained in the inner perimeter. The cup magnet is inserted into a bottom of the object cup. The retention disc is pushed into a bottom of the object cup to retain the cup magnet.

16 Claims, 3 Drawing Sheets

(56) References Cited

U.S. PATENT DOCUMENTS

2008/0011925 A1* 1/2008 Ruff et al. .................... 248/310
2008/0060479 A1* 3/2008 Nelson ........................... 81/3.09
2010/0265176 A1* 10/2010 Olsson et al. ................. 345/161
2011/0053701 A1* 3/2011 Eddings ........................ 473/286

* cited by examiner

MAGNETIC HOLDING DEVICE

BACKGROUND OF THE INVENTION

1. Field of the Invention

The present invention relates generally to holding devices and more specifically to a magnetic holding device, which allows small objects to extend outward from a mounting surface.

2. Discussion of the Prior Art

Patent no. 6305656 to Wemyss discloses a magnetic coupler and various embodiments thereof.

Accordingly, there is a clearly felt need in the art for a magnetic holding device, which allows small objects to extend outward from a mounting surface.

SUMMARY OF THE INVENTION

The present invention provides a magnetic holding device, which allows small objects to extend outward from a mounting surface. The magnetic holding device preferably includes a magnetic base and an object holder. The magnetic base preferably includes a base magnet and an adhesive pad. The adhesive pad includes a mounting pad, a pressure sensitive adhesive and an adhesive label. The pressure sensitive adhesive is applied to one side of the mounting pad and the adhesive label is applied to the pressure sensitive adhesive. The other side of the mounting pad is secured to base magnet with adhesive, glue or any other suitable device or method. The adhesive pad could be eliminated and the pressure sensitive adhesive applied to the base magnet.

The object holder preferably includes an object cup, a cup magnet and a retention disc. The object cup includes an inner perimeter, which is substantially the shape of an object inserted therein. The object cup is fabricated from a resilient material that allows some stretching. The inner perimeter is slightly smaller than a perimeter of the object to be retained in the inner perimeter. The cup magnet is inserted into a bottom of the object cup. The retention disc is pushed into a bottom of the object cup to retain the cup magnet. An outer perimeter of the retention disc is slightly larger than the inner perimeter of the object cup. A glue or adhesive may be applied to a perimeter of the retention disc and an inner perimeter of the object cup to ensure the retention disc remains in the bottom of the object cup.

In use, a mounting surface is cleaned to optimize adhesive retention. The adhesive label is removed from the pressure sensitive adhesive and the mounting base is applied to the mounting surface. An object is inserted into the inner perimeter of the object cup. The object cup is placed near the base magnet. The cup magnet in the object cup is drawn to the base magnet. The attraction between the base and cup magnets is sufficient to cause the object to extend outward from the mounting surface. The base and cup magnets are arraigned, such that a pole at a top of the base magnet is different than a pole at a bottom of the cup magnet.

Accordingly, it is an object of the present invention to provide a magnetic holding device, which allows small objects to be removably extended from a mounting surface.

These and additional objects, advantages, features and benefits of the present invention will become apparent from the following specification.

DETAILED DESCRIPTION OF THE PREFERRED EMBODIMENTS

Figure 1:
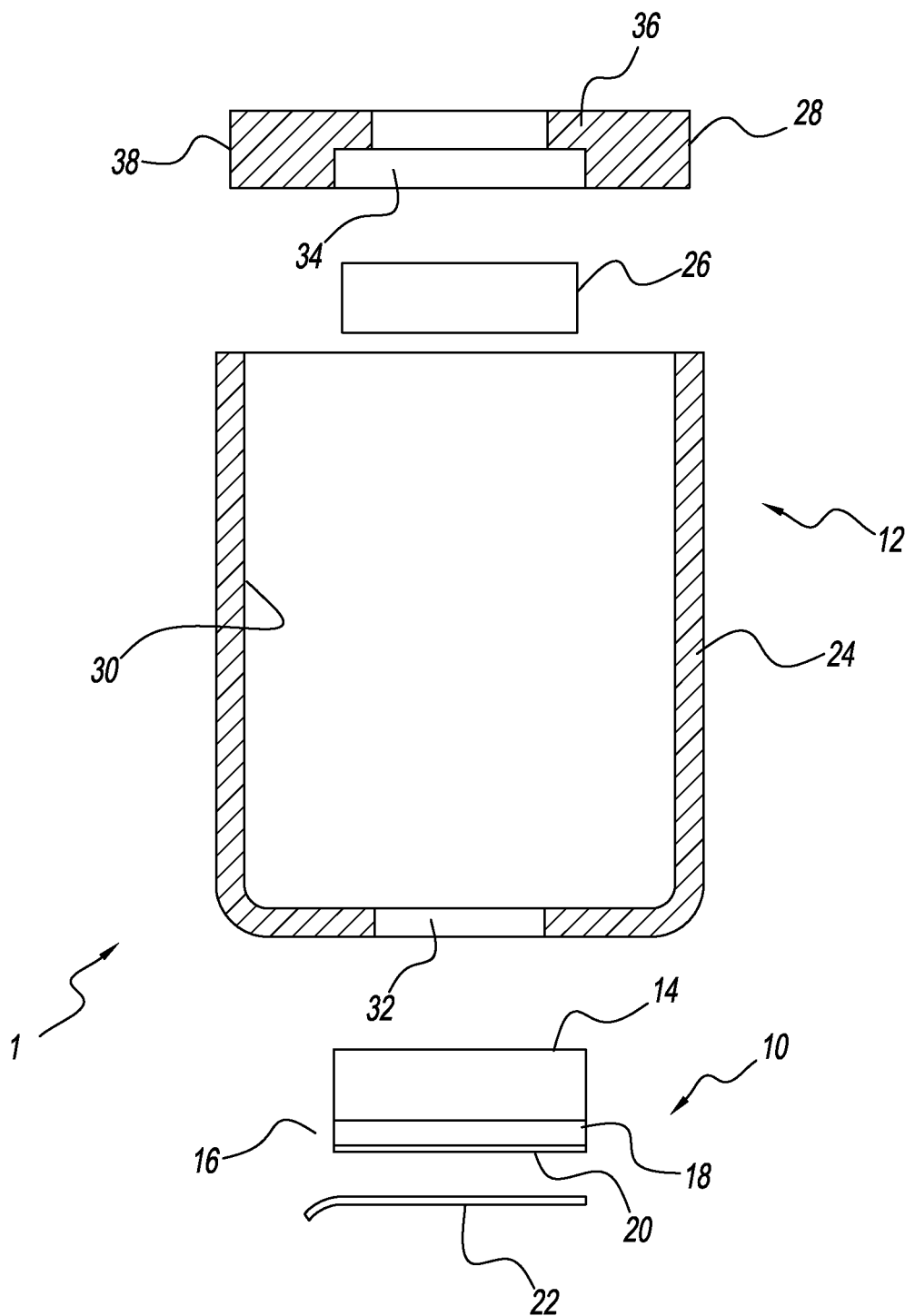
FIG. 1 is a side cross-sectional exploded view of a magnetic holding device in accordance with the present invention.
Figure 2:
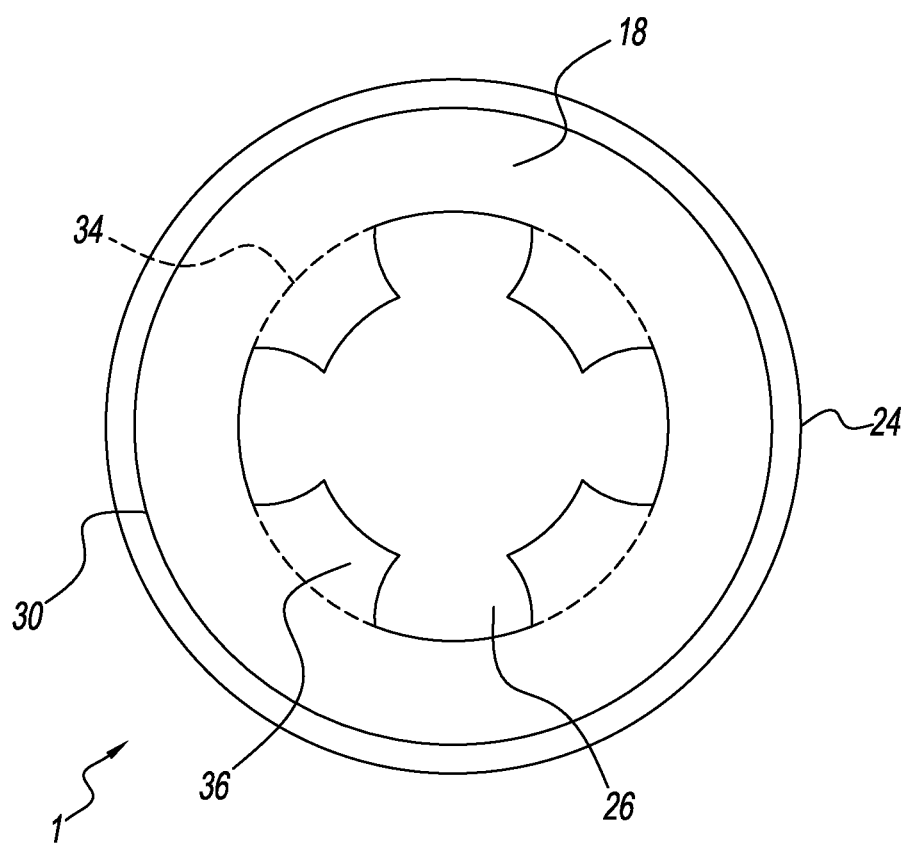
FIG. 2 is a top view of a magnetic holding device in accordance with the present invention.

With reference now to the drawings, and particularly to FIG. 1, there is shown an exploded cross sectional side view of a magnetic holding device 1. With reference to FIG. 2, the magnetic holding device 1 preferably includes a magnetic base 10 and an object holder 12. The magnetic base 10 preferably includes a base magnet 14 and an adhesive pad 16. The adhesive pad 16 includes a mounting pad 18, a pressure sensitive adhesive 20 and an adhesive label 22. The pressure sensitive adhesive 20 is applied to one side of the mounting pad 18 and the adhesive label 22 is applied to the pressure sensitive adhesive 20. The other side of the mounting pad 18 is secured to the first magnet 14 with adhesive, glue or any other suitable device or method. The base magnet is preferably a neodymium type of magnet.

Figure 3:
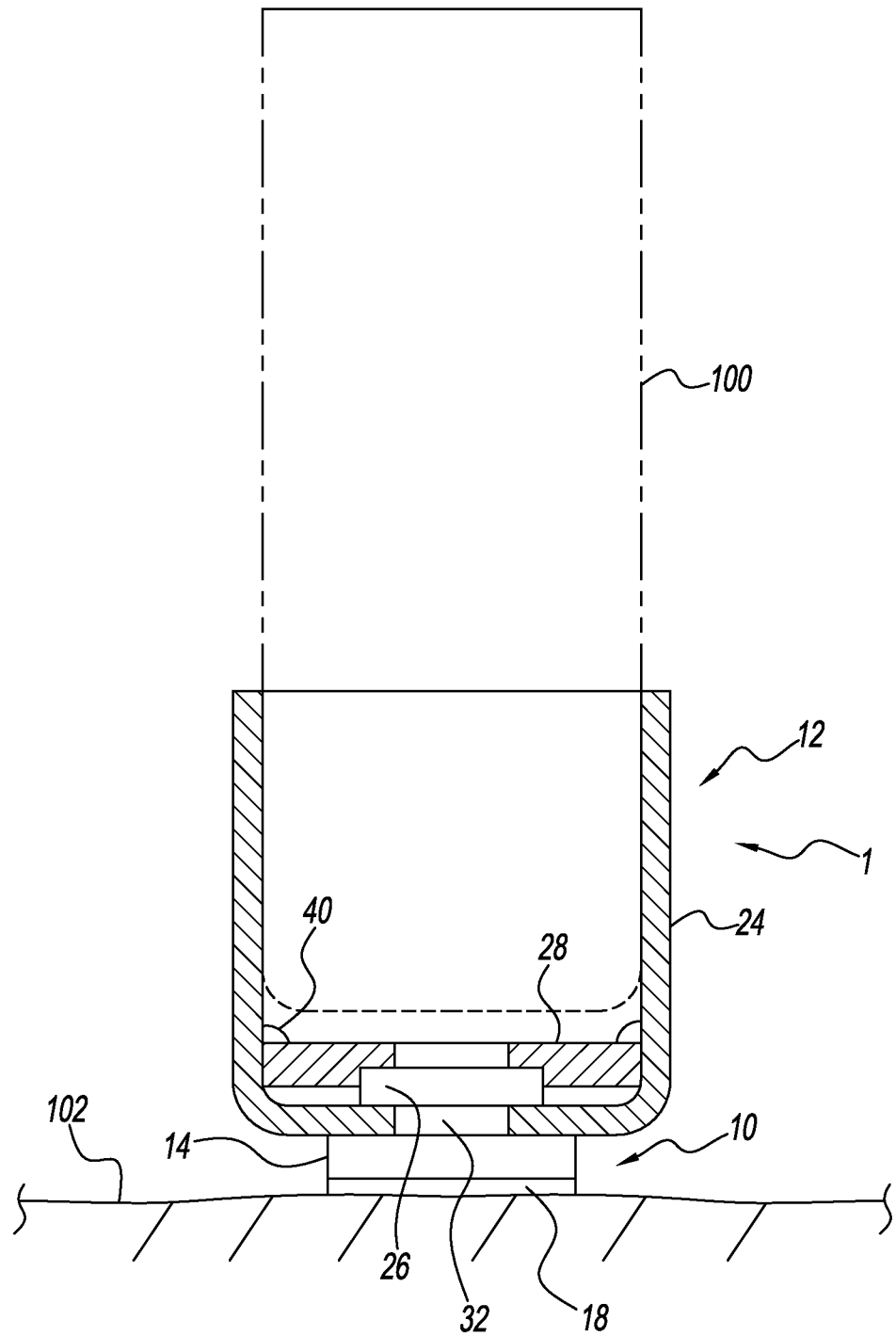
FIG. 3 is a side cross sectional view of a magnetic holding device with an object retained in an object cup in accordance with the present invention.

The object holder 12 preferably includes an object cup 24, a cup magnet 26 and a retention disc 28. With reference to FIG. 3, the object cup 24 includes an inner perimeter 30, which is substantially the shape of an object 100 inserted therein. The object cup 24 preferably includes an access opening 32 formed through a bottom thereof. The object cup 24 is fabricated from a resilient material with memory, which allows the inner perimeter 30 to stretch and return to its original size. The inner perimeter 30 is slightly smaller than a perimeter of the object 100 to be retained in the inner perimeter 30, such that an interference fit is formed between the inner perimeter 30 and the object 100. The retention disc 28 preferably includes a magnet counterbore 34 and a retention rim 36. The magnet counterbore 34 is formed in a bottom of the retention disc 28. The retention rim 36 forms a bottom of the magnet counterbore 34. The cup magnet 26 is inserted into a bottom of the object cup 24. The retention disc 28 is pushed into a bottom of the object cup 24 to retain the cup magnet 26. An outer perimeter 38 of the retention disc 28 is slightly larger than the inner perimeter 30 of the object cup 24. A bonding substance, such as glue or adhesive 40 may be applied to a top of the outer perimeter 38 and the inner perimeter 30 of the object cup 24 to ensure the retention disc 28 remains in the bottom of the object cup 24. However, the glue or adhesive 40 may also be applied to a top of the retention disc 28, such that the glue or adhesive 40 flows to the inner perimeter 30. Further, the retention disc 28 may be eliminated and the cup magnet 26 attached to a bottom of the object cup 24 with glue or adhesive. A counterbore may also be formed in a bottom of the object cup 24, which is sized to firmly receive an outer perimeter of the cup magnet 26. The cup magnet 26 may be retained in the counterbore, or additionally attached to the bottom of the object cup 24 with adhesive or glue.

In use, a mounting surface 102 is cleaned to optimize adhesive retention. The adhesive label 22 is removed from the pressure sensitive adhesive 20 and the mounting pad 18 is applied to the mounting surface 102. An object 100 is inserted into the inner perimeter 30 of the object cup 24. The object cup 24 is placed near the base magnet 14. The cup magnet 26 in the object cup 24 is drawn to the base magnet 14. The attraction between the first and second magnets 14, 26 is sufficient to retain the object 100 in an extended position from the mounting surface 100. The mounting surface 100 may be a top surface as shown, a bottom surface, a side surface or an angled surface.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A magnetic holding device comprising:
   a magnetic base includes a base magnet, a pressure sensitive adhesive and an adhesive label, said pressure sensitive adhesive is applied to one side of said base magnet, said adhesive label is applied to said pressure sensitive adhesive; and
   an object holder includes an object cup and a cup magnet, said object cup includes an outer perimeter, an inner perimeter, a bottom inner surface and a bottom outer surface, said inner perimeter is slightly smaller than a perimeter of an object to be retained in said inner perimeter, said cup magnet is retained on said bottom inner surface of said object cup, wherein said label is removed from said pressure sensitive adhesive, said base magnet is applied to a mounting surface, the object is inserted into said inner perimeter, said bottom of said object cup is brought in contact with said base magnet.

2. The magnetic holding device of claim 1 wherein:
   an access opening is formed through a bottom of said object cup.

3. The magnetic holding device of claim 1 wherein:
   said object cup is fabricated from a resilient material with memory.

4. The magnetic holding device of claim 1 wherein:
   said base magnet and said cup magnet are neodymium type magnets.

5. A magnetic holding device comprising:
   a magnetic base includes a base magnet and an adhesive pad, said adhesive pad includes a mounting pad, a pressure sensitive adhesive and an adhesive label, said pressure sensitive adhesive is applied to one side of said mounting pad and said adhesive label is applied to said pressure sensitive adhesive, an other side of the mounting pad is secured to said base magnet; and
   an object holder includes an object cup and a cup magnet, said object cup includes an outer perimeter, an inner perimeter, a bottom inner surface and a bottom outer surface, said inner perimeter is slightly smaller than a perimeter of an object to be retained in said inner perimeter, said cup magnet is retained on said bottom inner surface of said object cup, wherein said label is removed from said pressure sensitive adhesive, said adhesive pad is applied to a mounting surface, the object is inserted into said inner perimeter, said bottom of said object cup is brought in contact with said base magnet.

6. The magnetic holding device of claim 5 wherein:
   an access opening is formed through a bottom of said object cup.

7. The magnetic holding device of claim 5 wherein:
   said object cup is fabricated from a resilient material with memory.

8. The magnetic holding device of claim 5 wherein:
   said base magnet and said cup magnet are neodymium type magnets.

9. A magnetic holding device comprising:
   a magnetic base includes a base magnet, a pressure sensitive adhesive and an adhesive label, said pressure sensitive adhesive is applied to one side of said base magnet, said adhesive label is applied to said pressure sensitive adhesive; and
   an object holder includes an object cup, a cup magnet and a retention disc, said object cup includes an outer perimeter, an inner perimeter, a bottom inner surface and a bottom outer surface, said inner perimeter is slightly smaller than a perimeter of an object to be retained in said inner perimeter, said cup magnet is retained on said bottom of said object cup, said retention disc is retained on top of said cup magnet, said retention disc is secured to at least one of said bottom inner surface and said inner perimeter, wherein said label is removed from said pressure sensitive adhesive, said base magnet is applied to a mounting surface, the object is inserted into said inner perimeter, said bottom of said object cup is brought in contact with said base magnet.

10. The magnetic holding device of claim 9 wherein:
    an access opening is formed through a bottom of said object cup.

11. The magnetic holding device of claim 9 wherein:
    said object cup is fabricated from a resilient material with memory.

12. The magnetic holding device of claim 9 wherein:
    said base magnet and said cup magnet are neodymium type magnets.

13. The magnetic holding device of claim 9 wherein:
    a magnet counterbore is formed in a bottom of said retention disc to receive said cup magnet.

14. The magnetic holding device of claim 9 wherein:
    an outer perimeter of said retention disc is greater than said inner perimeter of said object cup.

15. The magnetic holding device of claim 9 wherein:
    an outer perimeter of said retention disc is attached to said inner perimeter of said object cup.

16. The magnetic holding device of claim 15 wherein:
    said outer perimeter of said retention disc is attached to said inner perimeter of said object cup with one of glue and adhesive.

\* \* \* \* \*